United States Patent [19]
Drucker

[11] Patent Number: 5,694,774
[45] Date of Patent: Dec. 9, 1997

[54] SOLAR ENERGY POWERPLANT

[76] Inventor: Ernest R. Drucker, 226 Searle Avenue, North York, Ontario, Canada, M3H 4B9

[21] Appl. No.: 610,130

[22] Filed: Feb. 29, 1996

[51] Int. Cl.⁶ .................................................. F03G 7/02
[52] U.S. Cl. .................. 60/641.11; 60/641.9; 60/641.12; 290/55
[58] Field of Search ...................... 60/641.11, 641.9, 60/641.12; 290/44, 55

[56] References Cited

U.S. PATENT DOCUMENTS

| | | | |
|---|---|---|---|
| 3,924,604 | 12/1975 | Anderson | 60/641.12 |
| 3,979,597 | 9/1976 | Drucker | 290/55 |
| 3,981,151 | 9/1976 | St. Clair | 60/641.12 |
| 4,508,971 | 4/1985 | Bailey | 60/641.12 |
| 4,779,006 | 10/1988 | Worthham | 290/55 |

Primary Examiner—Ira S. Lazarus
Assistant Examiner—Alfred Basichas

[57] ABSTRACT

A solar energy powerplant is described comprising a group of seven or more vertical towers open at both ends, these towers being mounted on a base structure in an equally spaced configuration with a single central tower surrounded by at least six towers. A plurality of vertically spaced, radially projecting heating chambers are mounted externally on each tower, each chamber projecting from the tower a distance at least equal to the radius of the adjacent tower. The chamber at each level is divided into a series of segment-shaped compartments separated by radial divider walls, each segment-shaped compartment having an inlet for ambient air and an outlet into the tower for heated air. Secondary heating chambers are associated with the radially projecting chambers, with each secondary heating chamber being positioned beneath a radially projecting chamber and having a V-shaped configuration with one wall thereof being a wall of the tower and the other wall thereof being upwardly and outwardly inclined from the tower wall and connecting at the upper end thereof to a bottom wall of the radially projecting chamber to thereby form both a secondary chamber wall and a support for the radially projecting chamber. Each secondary heating chamber has an inlet for ambient air and an outlet into the tower for heated air. A water reservoir is mounted at the top of each tower and a water reservoir is also in the base structure of the powerplant.

9 Claims, 3 Drawing Sheets

SOLAR ENERGY POWERPLANT

BACKGROUND OF THE INVENTION

1. Field of the Invention

This invention relates to a system for producing electrical energy, particularly with the use of solar heat as the prime energy source.

2. Description of the Prior Art

The patent literature is replete with systems utilizing wind, waves, and solar heat as energy sources for generating electrical power. The main sources of electrical power in the world today are hydroelectric systems and fossil fuel powered generating systems. The next most significant source of electrical power is nuclear powered generators.

As far as hydroelectric power is concerned, the power generators must be reasonably close to their ultimate market and the heavily populated and industrialized sections of the world are fast using up all available new sources of hydropower. The systems powered by fossil fuels such as coal, gas and oil have the problem that these fuels are now becoming in short supply and also are becoming extremely expensive. Also, fossil fuels are environmentally objectionable, since these contribute to global warming and also contaminate the atmosphere by leaving poisonous residues not only in the air, but also often in many effluents. The nuclear systems are not only very expensive in terms of construction costs but they also have the problem of requiring extensive safety systems to protect against the radiation in the plant itself. Moreover, there is also the major problem of safely disposing of the highly dangerous wastes.

Because of these problems with the traditional systems, there has been a greatly increased interest in solar energy as a major energy source. Various systems have been proposed involving the use of solar energy for generating electrical power and some such systems have recently been developed for space vehicles; see, for instance, Canadian Patent No. 718,175, issued Sep. 21, 1965. That system uses a solar energy absorber for heating a liquid which vaporizes to drive a turbine which in turn drives a generator. Such a system with its vaporizing and condensing systems is obviously practical only for very small systems such as would be used in space crafts.

There are many patents in existence which describe the use of wind power for driving electrical generators and one quite recent form of wind turbine generator is that described in U.S. Pat. No. 3,720,840 issued Mar. 14, 1973. In Goodman, U.S. Pat. No. 3,048,066, a vertical stack arrangement is described having a series of fans driven by solar created thermal currents, with the fans being capable of driving electric generators.

The failure of ground level solar energy collectors in the past has been related to an inadequate collection area. Thus, it is known that for a sunny region such as Texas, an average heat absorption of an optimally tilted collector is about 0.45 kw/m$^2$ as a year round average sunny, daylight hours. On this basis it has been estimated that a collector area of 37 square miles would be required for a 1000 mw power plant.

Of course, it is highly desirable to have these plants close to major population areas and in these areas land is at a premium. One design of solar power plant capable of greatly decreasing the land area requirements for a given amount of power production is that described in Drucker, U.S. Pat. No. 3,979,597, issued Sep. 7, 1976.

It is the object of the present invention to further improve the efficiency of power plant of U.S. Pat. No. 3,979,597.

SUMMARY OF THE INVENTION

In accordance with the present invention there is provided a solar energy power plant for producing electrical energy having as a principle component a group or cluster of tall, vertical towers. These towers are mounted on a base structure in an equally spaced configuration with a single central tower surrounded by at least six towers. A plurality of wind-powered impellers are mounted in vertically spaced locations within each tower such that chimney up-drafts in the towers drive these impellers. The impellers in turn drive electrical generators.

A plurality of vertically spaced, radially projecting heating chambers are mounted externally on each tower. Each chamber projects from the tower a distance at least equal to the radius of the adjacent tower, with the chamber at each level being divided into a series of segment-shaped compartments separated by radial divider walls. Each segment-shaped compartment has an inlet for ambient air and an outlet into the tower for heated air. Secondary heating chambers are associated with the above radially projecting chambers, with each secondary heating chamber being positioned beneath a radially projecting chamber and having a V-shaped configuration with one wall being a wall of the tower and the other wall being upwardly and outwardly inclined from the tower and connecting at its upper end to the bottom wall of the radially projecting chamber immediately above. Thus, each secondary chamber provides a support for the radially projecting chamber immediately above and each secondary heating chamber has an inlet for ambient air and an outlet into the tower for heated air.

A water reservoir is mounted at the top of each tower and a further water reservoir is provided in the base structure of the power plant. Heat exchange coils are located within the heating chambers and water passes through these coils while travelling back and forth between the reservoir in the base structure which holds hot water and the reservoir at the top of the tower which holds cooler water. Thus, during periods of maximum solar heating, cooler water from the reservoir at the top of each tower moves down through the heat exchangers and is heated and stored in the bottom reservoir. Then, during periods of low or no solar radiation outside air entering the bottom of each tower is passed over the warm water in the bottom reservoir whereby the temperature of the air is raised by about 2°–3° C. This creates an up-draft of air within each tower.

Additional heat from the warm water in the bottom reservoir is utilized by passing the warm water through a heat exchanger pump which is used to produce steam. Heat can be removed in this manner from the water in the bottom reservoir until its temperature is only about 5° C. higher than outside air. The steam generated may be used to power turbines for producing additional electricity.

The solar heating is provided by tiltable concave mirrors mounted on the outermost edges of the segment-shaped compartments. Each compartment outer edge carries a pair of separately tiltable concave mirrors which can be tilted such that they will heat both the top faces of the radially projecting heating chambers as well as their lower faces and the secondary heating chambers.

The towers are relatively tall relative to their diameters since this produces the highest upward air velocities. A typical tower has a height of approximately 50 to 100 meters and a base diameter of about 10 to 20 meters, a preferred design is a tower having a height of about 60 meters, with 30 heating chamber levels vertically spaced at a distance of about 2 meters. Each 2 meter vertical space preferably holds two horizontally mounted impellers each having a diameter of about one meter.

For towers of the above type, a typical water reservoir at the top of each tower may have a diameter in the order of 20 meters and a volume of about 25 cubic meters.

According to a further feature of this invention, the surfaces of the towers exposed to the rays of the sun provide excellent locations for photovoltaic cells. These are best mounted on the top faces of the radially projecting heating chambers and on the outer walls of the secondary heating chambers. The photovoltaic cells are used for direct production of electricity during sunlight hours and may produce up to 10% of the total electricity production of each tower.

An important feature of this invention is that by providing these high towers in combination with the plurality of radially projecting, vertically spaced solar heating chambers mounted on the tower, a very large effective solar energy collecting area is provided directly on the tower itself rather than the usual method of using ground collectors spread over a large area. This arrangement with the tiltable mirrors takes special advantage of the fact that through almost the entire period of sunlight each day the rays of the sun are at an angle to the vertical.

By arranging the towers in clusters with the concave mirrors mounted at the outermost edges of the heating chambers, the sides of the towers remote from the sun within the cluster can be heated by reflected solar rays. In this manner the maximum utilization of the solar rays can be achieved within the cluster.

A particular advantage of these clusters of towers is that they can be constructed in the form of islands and placed off-shore in a lake or river near large population areas. In this way, they can avoid the use of very valuable land near these areas of high population density. They also optimize the use of electric energy being generated in large quantities at night and in the early hours of the morning for industrial energy requirements, with the industrial section of any larger city.

DESCRIPTION OF THE PREFERRED EMBODIMENTS

The impellers may be selected from a variety of different types presently available, it being appreciated that any arrangement of blades or vanes which will turn a shaft to which they are attached when exposed to wind may be called a wind-powered impeller. Among suitable impellers there can be mentioned the multi-blade turbine wheel (American type), propeller-type high speed wheels, etc. The impellers are preferably mounted on horizontal shafts with these horizontal shafts being directly connected to alternators for producing electrical energy. The impellers are preferably formed from a lightweight metal, e.g. aluminum alloy.

The reservoirs at the tops of the towers serve a dual purpose. They first serve as a reservoir for cooler water to be heated by way of the heating coils in the heating chambers. For this purpose, the water flows by gravity from the reservoirs at the tops of the towers down through the heating coils and into the reservoir at the bottom. These top reservoirs also serve a second important purpose in that the mass of the water in these reservoirs has an important stabilizing effect on the tall slender towers. Thus, when there is a large mass located at the top of each tower, they show greatly improved stability against winds.

The reservoirs at the tops of the towers can conveniently be re-filled by pumping water to them when demand for electricity is low and therefore power is abundant, e.g. during the night or in the early morning.

It is particularly advantageous to locate the base structure for the solar energy power plant off-shore in a lake or river. In addition to avoiding the use of valuable land in or near to a city, the water in the lake or river does not go through extremes of temperature change. This also makes it easy to obtain an unlimited supply of sweet water and up-drafts from the water are greater in the early evening than is the case on dry land.

The large surface areas being heated by solar energy may also further be utilized according to this invention as support for silicon strips for further direct electricity production.

The device is provided with automatic controls which regulate the airflow travelling up the tower. This can be done by measuring the impeller speeds within the tower and utilizing this to control dampers on inlet air at the base of the tower as well as from the solar heating chambers. For instance, during periods of peak solar radiation, only a minimum amount of solar energy may be required to provide convection airflow up the tower and the remainder of the solar energy can then be entirely concentrated in heating the water. On the other hand, during periods of minimum solar radiation, ambient air is directed through the heat exchange zones where this air picks up heat from the hot water of the reservoirs. In this way, a relatively constant upward airflow through the tower is maintained.

BRIEF DESCRIPTION OF THE DRAWINGS

The invention is further illustrated by the attached drawings in which.

DETAILED DESCRIPTION OF THE INVENTION

Figure 2:
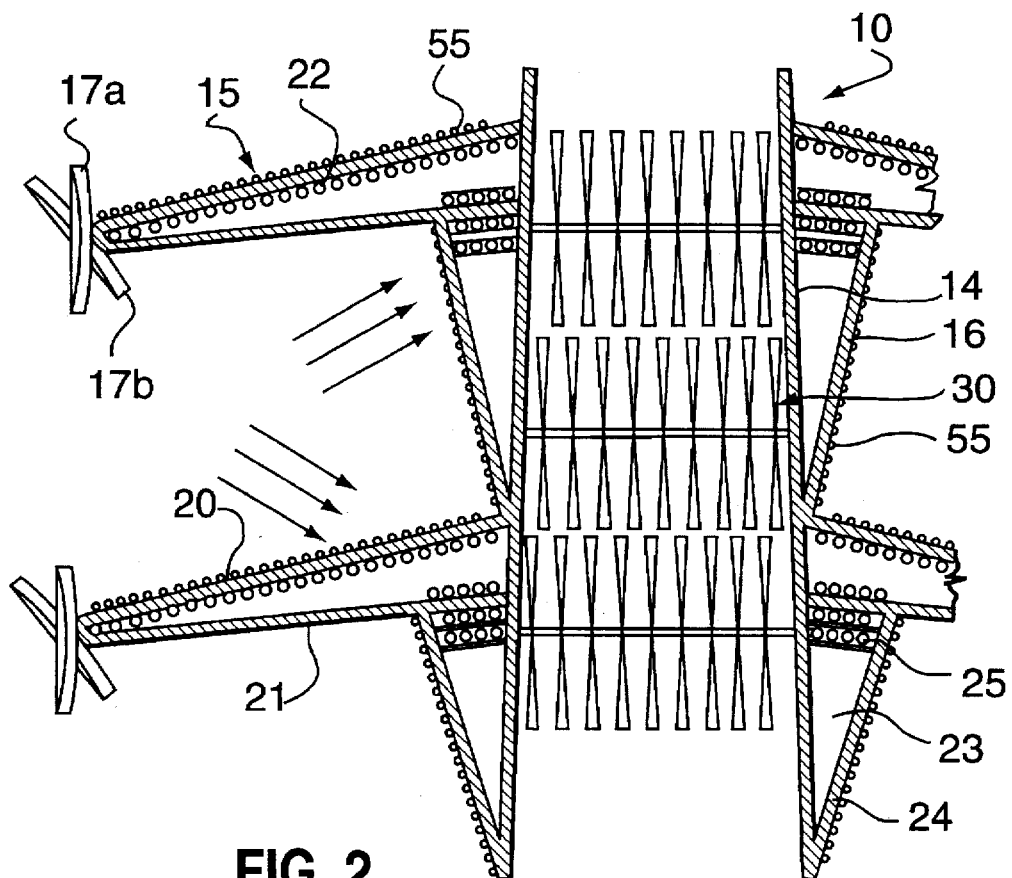
FIG. 2 is an elevation view in sections showing a part of a tower.
Figure 3:
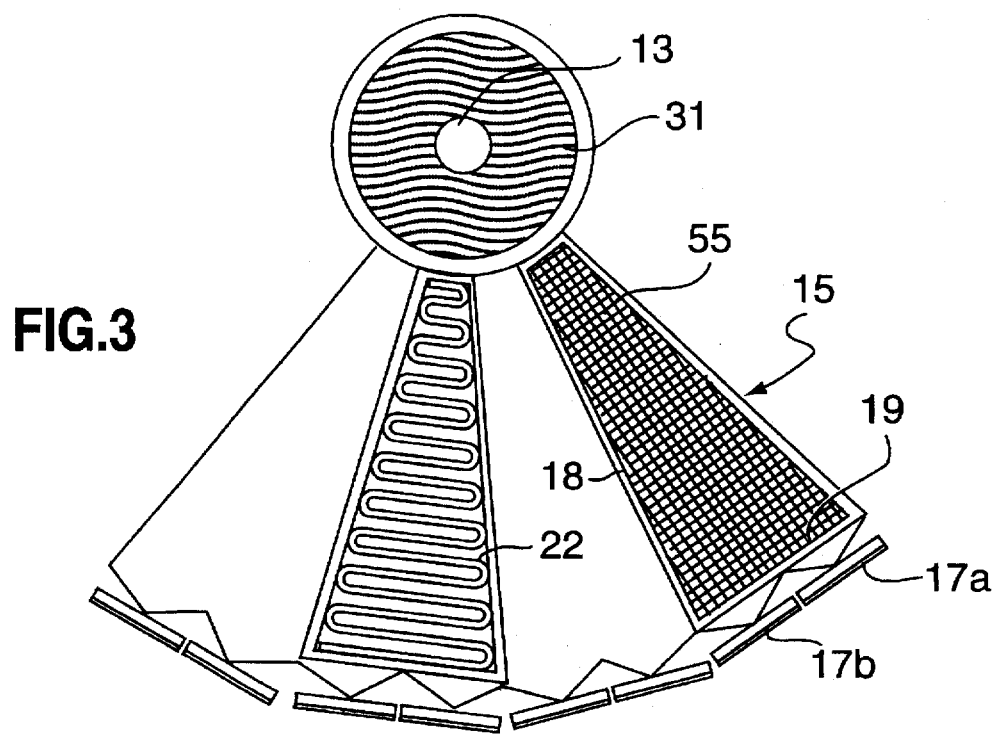
FIG. 3 is a top plane view of one tower in partial section.
Figure 4:
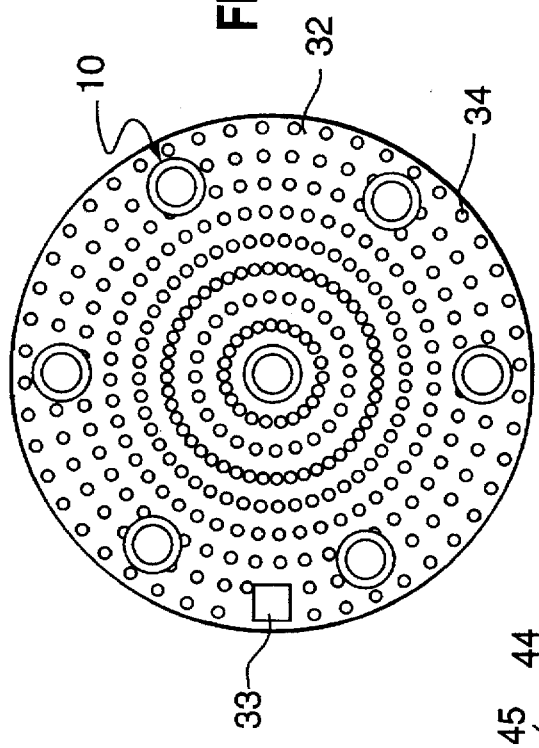
FIG. 4 is a top plane view of a complete power plant.

The power plant includes a series of towers 10 each mounted on a base portion 11 and including a bottom air inlet 12 and a top air outlet 13. Each tower tapers inwardly towards the top. Mounted on the peripheral wall 14 of each tower are a series of outwardly projecting and vertically spaced solar heating chambers 15. Each of these chambers 15 is composed of a series of segments as shown in FIG. 3 divided by radial divider walls 18 and terminating outer end walls 19. Mounted on the outer end of each chamber segment are a pair of concave mirrors 17A and 17B which are independently tiltable. As shown in FIG. 2, the solar heating chambers 15 have a top face 20 and a bottom face 21. Directly beneath the top faces 21 are tubular copper heat exchange coils 22. These tubes carry water which is heated by the absorbtion of solar rays. Within each heating chamber compartment 15 is a airflow deflector defining an airflow path along the solar heating surfaces. An inlet is provided for introducing ambient air into the flow path and an outlet is provided in tower wall 14 for introducing heated air into the tower.

Mounted beneath each segment of a heating chamber 15 is a secondary heating chamber 16 comprising a V-shaped chamber 23 having an outer wall 24 inclined upwardly and outwardly from the tower wall 14. Thus, the side walls of the V-shaped chamber 23 are formed by outer wall 24 and wall 14 of the tower 10. The outer wall 24 is connected at its upper end to the bottom face of chamber 15 thereby providing addition support for the chamber 15. Additional copper heating coils 25 are provided within the secondary heating chamber 23.

The heated air in the secondary chambers 16 may be controlled by computer responding thermocouples. When the temperature in any secondary chamber exceeds 10° C. over and above the outside air temperature, an inlet into the main tower body opens allowing the hotter air from the secondary chamber to flow into the tower and thus provide additional up-draft to power the impellers 30 within the tower. When the temperature in the secondary chamber again approaches ambient air temperature, the inlets close to allow the air within the secondary chamber to heat up.

The impellers 30 are in the form of light windmills. Each impeller is mounted on a horizontal axis and has a diameter of preferably about 1 meter. Two of these impellers 30 are typically mounted between adjacent pairs of radially projecting heating chambers 15.

Figure 5:
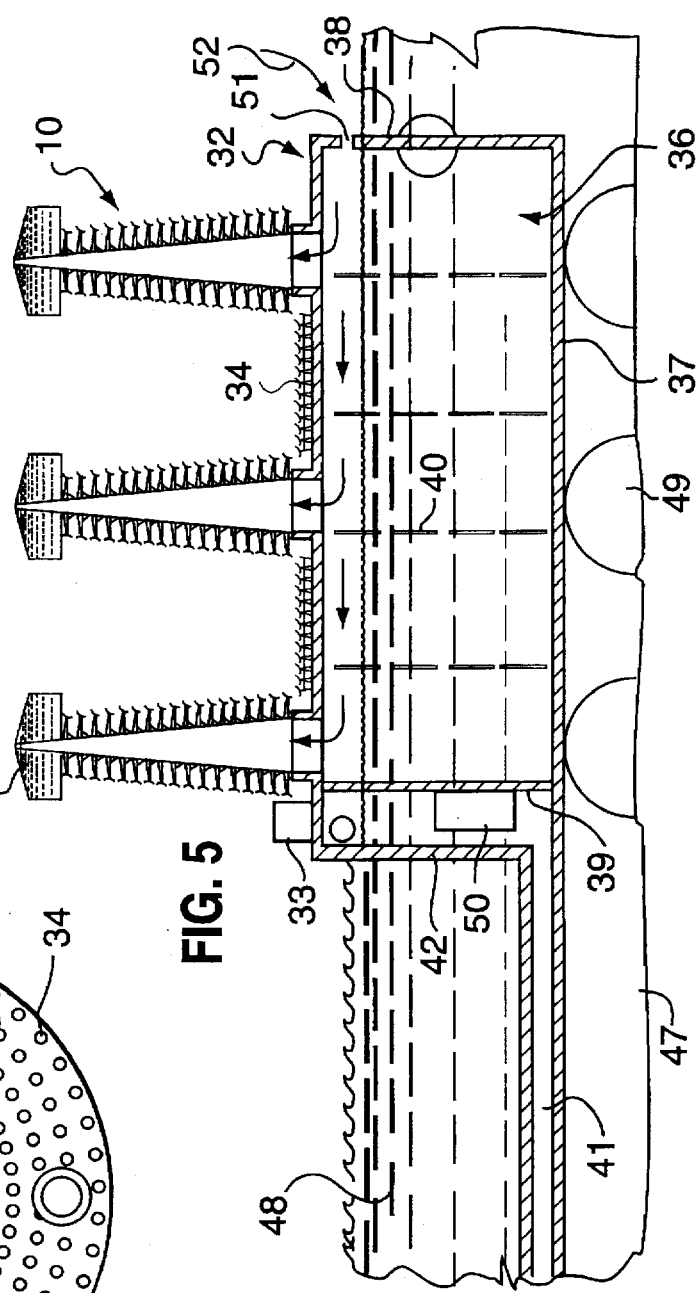
FIG. 5 is an elevation view of a complete power plant.

An important feature of this design is that each heating chamber 15 adds further heat to the up-draft air in the tower 10. This means that the velocity of the up-draft air in the tower increases as it progresses up the tower. As seen in FIG. 5, outside air 52 is drawn in through inlet 51 of reservoir wall 38 and flows across the surface of the water in the reservoir. This raises the temperature of the air by about 2°-3° C. and provides a strong initial up-draft. With additional heating being added at each successive heating chamber 15, the velocity of the up-draft air increases by about 10% at each successive chamber 15. This means that the air velocity has increased by 200% when it reaches the twentieth chamber 15.

Figure 1:
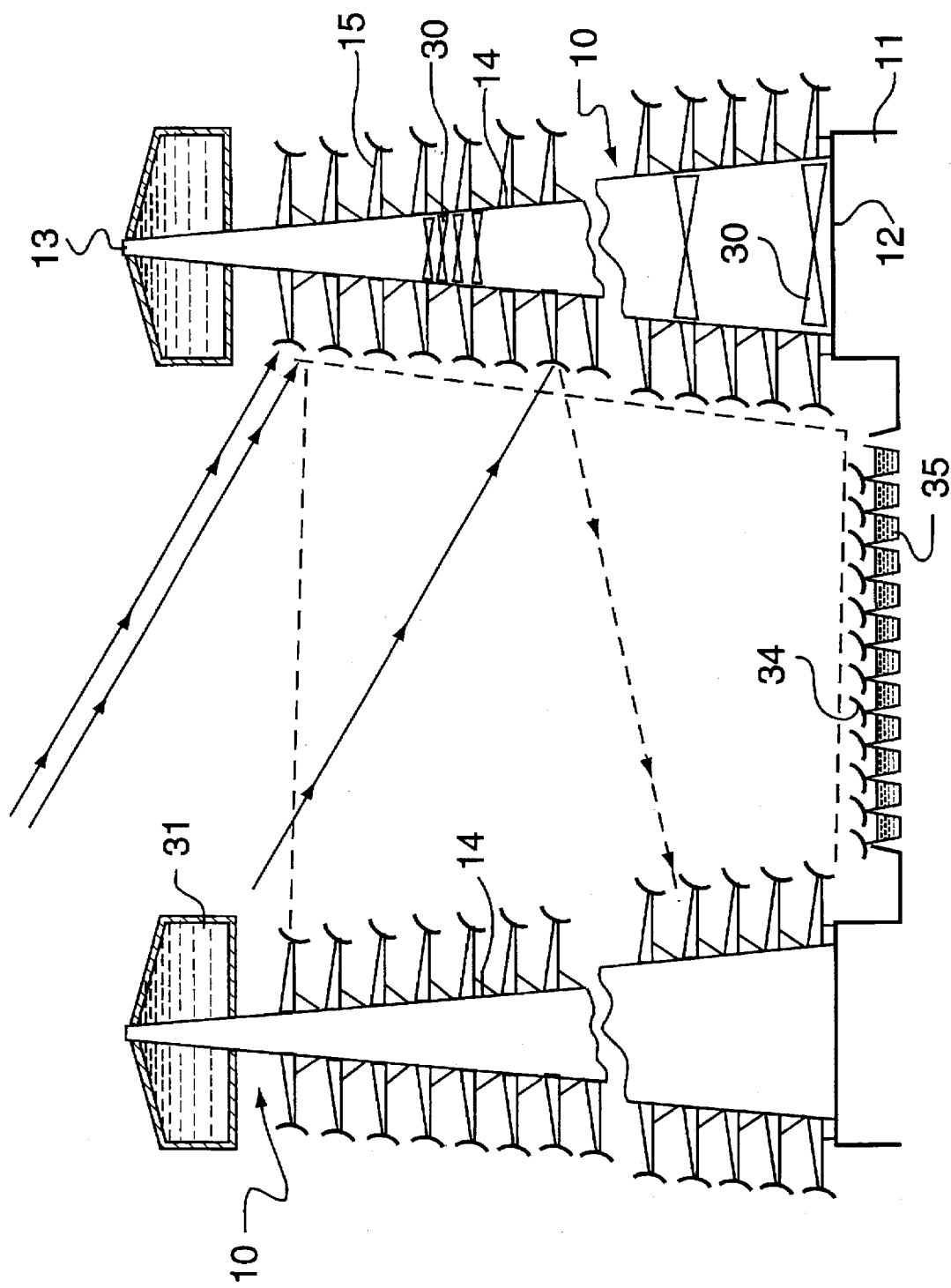
FIG. 1 is a schematic elevation view of one embodiment of the invention.

From FIG. 1 it can be seen that the direct solar rays in part strike the top faces of the heating chambers 15 and in part strike the concave mirrors 17A, 17B and 34. The reflected rays from the mirrors can be used to heat the sides of adjacent towers which are not directly in line with the rays from the sun. The mirrors can further be used to reflect rays from the sun onto the secondary heating chambers.

The fluid flow portion of the system includes a water reservoir 31 mounted at the top of each tower 10 and bottom reservoir 36 mounted within a main support base 32. The top reservoir preferably has a sloped roof to allow for very heavy rain or heavy wet snow. The main support base includes an operational control centre 33 and a plurality of upwardly reflecting mirrors 34 extending across the top of the support base between the towers 10. The main support base 32 includes a bottom wall 37, outer side wall 38 and an inner wall 39 defining the bottom reservoir 36. The reservoir 36 may also include dividers 40. Between the inner wall 39 and outer wall 38 is a service compartment 42 which may be entered through channel 41.

A heat exchange pump 50 is utilized to extract heat from the warm water in reservoir 36. The warm water is passed through the heat pump 50 to produce steam, which can be used to power a turbine for producing electricity or as a commercial or residential heat source. Heat can be extracted from the water in the reservoir until the water has a temperature only about 5° C. higher than outside air.

The tower system of the invention is also used to produce electricity directly by means of photovoltaic cells. These cells 55 are located on the top faces 20 of heating chambers 15 as well as on the outer walls 24 of secondary heating chambers 16. The cells 55 are capable of producing up to 10% of the total electricity produced by each tower.

Figure 6:
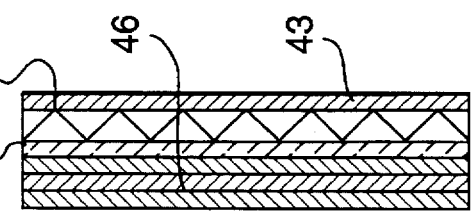
FIG. 6 is a section of a bottom reservoir wall.

The entire main support base 32 may rest on a river or lake bed 47 resting within water 48 and sitting on foundations 49. In order to maintain the water in reservoir 36 at a maximum high temperature, the walls of the compartment are preferably formed of a very strong insulated construction as shown in FIG. 6. Thus, the wall includes an outer shell 43, a structural section 44 for strength and rigidity, an insulating portion 45 and inner walls 46.

Also for use in cold climates, the top reservoir may be constructed with multiple walls. These multiple walls may include a circulating air corridor. This air corridor prevents the water inside the reservoir from freezing and during day light hours the air within the outside and inside reservoir wall is heated by the lenses of the adjoining tower arms. This provides not only energy from sunlight, but also causes the air contained with the corridors to move by convection.

The water used in the reservoirs is preferably a soft water with most impurities removed. For instance, water which is known to contain a large percentage of calcium may cause serious deposits within the flow conduits. Furthermore, in cold climates where the air temperature may go below the freezing point, it may be necessary to include a quantity of anti-freeze within the water. This water containing anti-freeze can, of course, be recirculated between the top and bottom reservoirs and is not, therefore, an environmental hazard.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. A solar energy powerplant comprising a group of seven or more vertical towers open at both ends, said towers being mounted on a base structure in an equally spaced configuration with a single central tower surrounded by at least six towers, a plurality of vertically spaced, radially projecting heating chambers mounted externally on each tower, each said chamber projecting from the tower a distance at least equal to the radius of the adjacent tower, with the chamber at each level being divided into a series of segment-shaped compartments separated by radial divider walls, each said segment-shaped compartment having an inlet for ambient air and an outlet into the tower for heated air, secondary heating chambers associated with said radially projecting chambers, with each secondary heating chamber being positioned beneath a said radially projecting chamber and having a V-shaped configuration with one wall thereof being a wall of the tower and the other wall thereof being upwardly and outwardly inclined from the tower wall and connecting at the upper end thereof to a bottom wall of the radially projecting chamber to thereby form both a secondary chamber wall and a support for the radially projecting chamber, and each secondary heating chamber having an inlet for ambient air and an outlet into the tower for heated air, a water reservoir mount at the top of each tower and a water reservoir in the base structure of the powerplant, conduit and pump means for moving water between said reservoirs by way of heat exchange coils in said heating chambers such that hotter water is stored in the reservoir in the base structure and cooler water is stored in the reservoir at the top of each tower, tiltable concave mirrors mounted on the outermost edges of the segment-shaped compartments and wind-powered impellers horizontally mounted in at least the upper half of each tower in vertically spaced locations in association with said heating chambers, said impellers being adapted to drive electrical generating units.

2. A powerplant according to claim 1 wherein a pair of independently tiltable concave mirrors is mounted on the outermost edge of each radially projecting heating chamber.

3. A powerplant according to claim 1 comprising a substantially circular cluster of said towers with concave mirrors being mounted on the outermost edges of the heating chambers, whereby the sides of the towers remote from the sun within the cluster are heated by reflected solar rays.

4. A powerplant according to claim 1 wherein concave mirrors are mounted at the base in the regions between the towers of a cluster.

5. A powerplant according to claim 1 wherein said group of towers are mounted on a single base portion, said base containing an insulated water reservoir.

6. A powerplant according to claim 5 wherein the base portion rests within water on a lake bed or sea bed.

7. A powerplant according to claim 1 wherein two impellers are mounted between each adjacent pair of radially projecting heating chambers.

8. A powerplant according to claim 1 which includes photovoltaic cells for direct electricity production located on the top faces of the radially projecting heating chambers and on the outer walls of the secondary heating chambers.

9. A powerplant according to claim 1 which includes a heat exchange pump for extracting heat from the water in the bottom reservoir and converting this to steam.

* * * * *